(No Model.)

C. M. G. MILLOCHAU & A. L. BERNAUD.
LUBRICATOR.

No. 580,528. Patented Apr. 13, 1897.

Witnesses:
L. M. Wachschlager,
Geo. E. Morse

Inventors
Charles M. G. Millochau
Anatole L. Bernaud
By Briesen & Knauth
their Attorneys.

UNITED STATES PATENT OFFICE.

CHARLES MARIE GASTON MILLOCHAU AND ANATOLE LÉON BERNAUD, OF NANTERRE, FRANCE.

LUBRICATOR.

SPECIFICATION forming part of Letters Patent No. 580,528, dated April 13, 1897.

Application filed June 27, 1896. Serial No. 597,232. (No model.) Patented in France December 18, 1895, No. 252,590.

*To all whom it may concern:*

Be it known that we, CHARLES MARIE GASTON MILLOCHAU and ANATOLE LÉON BERNAUD, of the city of Nanterre, near Paris, France, have invented Improvements in Lubricating Apparatus, (for which we have obtained Letters Patent in France for fifteen years, dated December 18, 1895, No. 252,590,) of which the following is a full, clear, and exact description.

This invention relates to apparatus for automatically and continuously lubricating engines and machinery, shafting, &c. The apparatus is adapted to work at any distance, is of simple construction, contains no part liable to get out of gear, break, or wear, and needs no supervision. It can be placed in any position and may work while the machine to be lubricated is not in motion. The same size of apparatus may be used for lubricating engines of any kind or power, and it may work continuously for a period only limited by the capacity of the oil or grease reservoir from which it is supplied, while the rate of flow of the lubricating material through the ducts is capable of great variation. The regularity with which the minimum of lubricating material is uninterruptedly supplied to the parts enables a considerable economy to be realized as compared with the means ordinarily employed, and avoids accidents by dispensing with the services of attendants.

The invention may be carried into effect in various ways to suit the nature of the case, and an example of the apparatus is represented in the accompanying drawings, in which—

Figure 1:
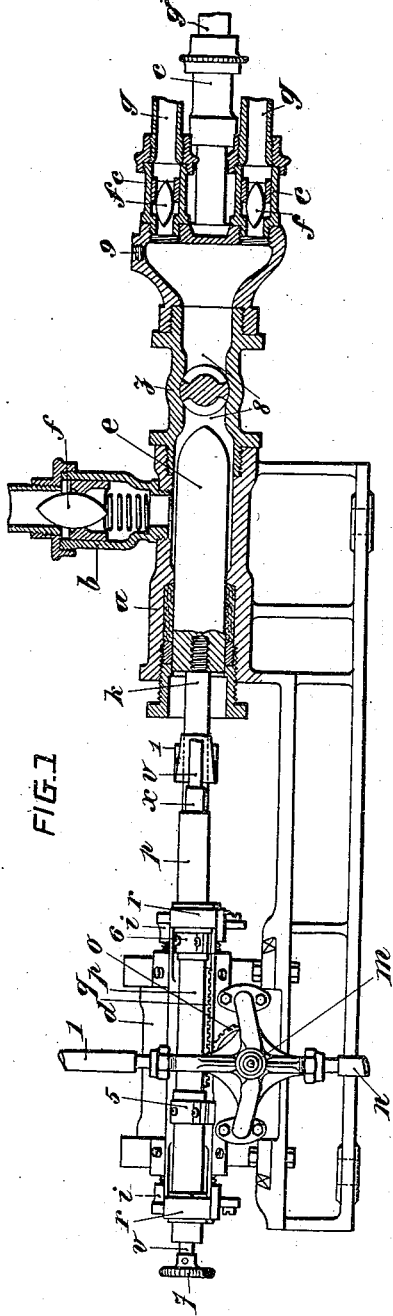
Figure 2:
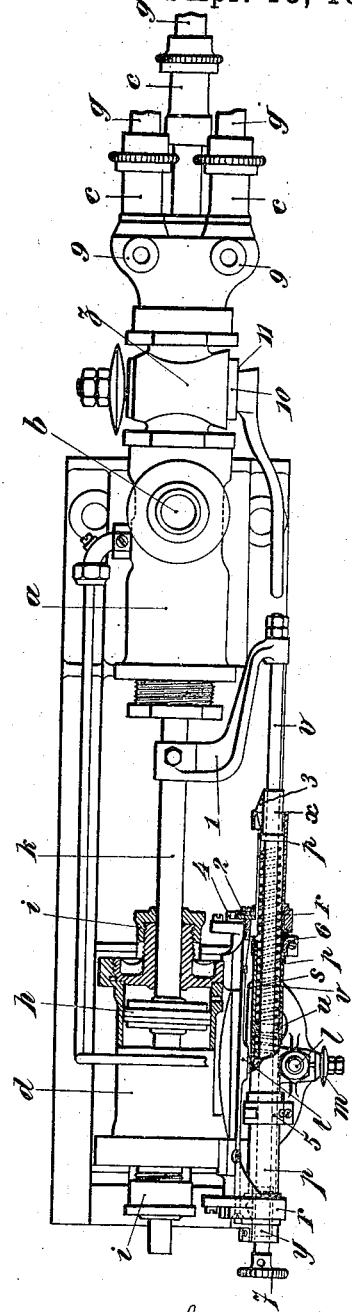

Figure 1 is an elevation, partly in vertical longitudinal section, of a lubricating apparatus embodying our invention; and Fig. 2 is a plan view thereof, partly in transverse horizontal section.

The apparatus comprises two distinct parts, viz: first, the oil or grease pump $a$, with its suction-valve box $b$ and delivery-valve boxes $c$, and second, the fluid-pressure motive apparatus or motor-cylinder $d$ with its distribution valve-gear. Both of these parts may be mounted upon the same frame.

The oil or grease pump cylinder $a$ may have either a double-acting piston or a plunger $e$, as shown. The valves are contained in ordinary valve-boxes and are each provided with a stem or with guide-wings and may be either cylindro-conical or ogival-headed at one or at both ends, as shown at $f$, Fig. 1, for the purpose of facilitating the passage of the oil or grease. The working cylinder $d$ has a double-acting piston $h$, Fig. 2, whose rod may extend in both directions through stuffing-boxes $i$, the end $k$ of the piston-rod being connected to the pump-piston $e$ by a screw connection, for example, as represented in Fig. 1.

The piston $h$ may be operated either by means of a liquid under pressure, by compressed gas, or by steam pressure. On the backward stroke of the pump-piston $e$ the oil or grease is drawn into the pump-cylinder through the inlet-valve $b$, and on the forward stroke it is delivered through the valves $c$ and pipes $g$ to the points to be lubricated. The forward stroke should be exceedingly slow, so as to obtain the greatest possible economy of lubricating material, and will vary according to the size, nature, and number of the parts to be lubricated. It will be in all cases very slow as compared with that of the piston of a steam-engine. However slow its motion may be, it is necessary that the action of the actuating fluid be reversed precisely at the moment when the piston arrives at the end of its stroke. This necessitates the use of special distribution-gear, such as represented in the drawings, in which the actuating fluid is admitted by pipe 1 and is distributed to the front or rear end of the cylinder by a four-way cock or distributing-valve $m$. When the fluid is admitted to the front end of the cylinder, the other end is in communication with the exhaust-pipe $n$, and by turning the cock ninety degrees the reverse effect takes place, the operating fluid passing to the rear end of the cylinder and its front end being placed in communication with the exhaust. For the purpose of rotating it ninety degrees at each end of the stroke of the working piston a small crank or a toothed segment $v$, for example, is fixed to the plug of the cock, as shown in Fig. 1, and is coupled by a connecting-rod or geared by a rack $q$, as represented in Fig. 1, with a sleeve $p$, which is free to slide in guides $r\ r$ and is prevented from turning by a feather $s$, sliding in a guide $t$, the guides $r\ r$ being slotted to give passage to rack $q$ and feather $s$ when placing the sleeve $p$ in position. In order that the valve may be thrown suddenly, we provide a yielding connection between the sleeve $p$ and the piston-rod, as follows: The sleeve $p$ is provided at mid-length with an internal partition $u$, centrally apertured for the passage of a rod $v$, carrying spiral springs, which bear against opposite sides of the partition $u$. The springs may be alternately compressed by means of collars $x\ y$ on rod $v$, the extent to which each of the springs may be compressed being greater than the common stroke of the pistons. During the return stroke of the pump-piston the arm, fixed to piston-rod $k$, carries the rod $v$, attached thereto, back with it and causes collar $x$ to compress the adjacent spring against the partition $u$, the effect of which would be to slide the sheath $p$ longitudinally were it not held stationary by a bolt or catch 2, Fig. 2, pressed by a spring 4 into engagement with a notch in the sheath. The spring continues to be compressed throughout the entire stroke of the pistons, however slow it may be, until on arriving at the end of the backward stroke the apex of the inclined faces of a cam 3, carried by collar $x$, and which moves in a slot in the sheath $p$, forces back the bolt or catch 2, and so releases the sheath, which is thereupon caused to slide quickly backward and rotate the distributing cock or valve $m$ through ninety degrees. On the forward stroke the same movements take place in inverse direction, and at the end of the stroke the sheath is forced forward by the other spiral spring and the bolt or catch 2 again falls into engagement with the sheath.

5 and 6 are collars fixed on the sheath $p$ and acting as stops to limit the movement of the latter by abutting against the bearings $r\ r$.

The adjustment of the distribution valve-gear and the setting of the collars $x\ y$ in position may be effected by turning a knob 7, screwed on the end of rod $v$.

In lubricating the moving parts of a machine the pressure at the delivery of the pump-cylinder should be relatively weak, as before mentioned, however great may be the pressure of the fluid employed for actuating the lubricator, and this is insured by means of a throttle-valve $z$, having a truncated conical plug whose mean diameter is greater than that of the cylindrical bore 8 of the cock-casing and which is hollowed symmetrically at opposite sides, as shown in Fig. 1, so that by suitably adjusting it only the smallest quantity of oil or grease may be allowed to pass, thus producing in the flow-pipes the exact pressure required, which may be indicated on a gage fixed at 9. The part 10, Fig. 2, of the plug has a mark parallel to its axis which when the plug is turned comes successively opposite to divisions marked upon the face 11, thus enabling the plug to be returned to the exact position previously occupied. The gage serves not only to indicate the pressure at the delivery, but also as a means of ascertaining the working of the lubricator.

For lubricating the slide-valves and cylinders of a steam-engine the boiler-steam may be used for actuating the lubricator, the relative diameters of the working pump-pistons being such that there will always be an excess of pressure per unit of surface upon the pump-piston which is more than sufficient and which is reduced to the minimum by means of the throttle-regulator $z$.

The invention may be employed for machinery generally, including hydraulic engines, compressed-air engines, electrical machines, cylinders of steam-hammers, rolling-mills, &c., and more particularly for large marine and stationary engines, all the movable parts of which may be lubricated by means of flexible piping, as well as to locomotives.

We claim—

The herein-described automatic continuously-acting lubricating apparatus comprising the following instrumentalities in operative relation, to wit: a grease or oil pump having an inlet-valve and a valved outlet leading to an engine to be lubricated, a fluid-pressure motive apparatus for driving the said pump, a rotary distributing-valve for distributing fluid to the said motive apparatus, a toothed arc for rotating the valve, a rack on a moving part of the fluid-pressure motive apparatus, a yielding coupling intervening between the rack and its moving operating part, a catch for receiving the thrust of the said coupling until a predetermined time, whereby the energy of the movement of the said moving part will be stored in the said yielding coupling, and a releasing device for the catch whereby the yielding coupling will exert its force at a predetermined time to throw the valve suddenly, substantially as described and for the purposes set forth.

The foregoing specification of our improvements in lubricating apparatus signed by us this 8th day of June, 1896.

CHARLES MARIE GASTON MILLOCHAU.
ANATOLE LÉON BERNAUD.

Witnesses:
CLYDE SHROPSHIRE,
MAURICE HENRI PIGNET.